United States Patent [19]

Moore et al.

[11] 3,952,383

[45] Apr. 27, 1976

[54] STRAP FITTING FOR AUTOMOBILE INTERIOR AND OTHER USES

[75] Inventors: Ronald D. Moore, Grosse Pointe; Everett L. Bethel, Sterling Heights, both of Mich.

[73] Assignee: Chivas Products Limited, Warren, Mich.

[22] Filed: Jan. 6, 1975

[21] Appl. No.: 538,538

[52] U.S. Cl. ............................ 24/265 R; 190/57; 296/135
[51] Int. Cl.² ..................... A47B 95/02; B60J 7/20
[58] Field of Search ............... 190/39, 57; 52/716, 52/717; 24/73 FT, 73 PM, 265 R, 31 B, 31 L, 265 R; 16/124, 125, 116 R; 296/135

[56] References Cited
UNITED STATES PATENTS

| | | | |
|---|---|---|---|
| 1,008,604 | 11/1911 | Lake | 190/57 |
| 1,125,280 | 1/1915 | Felsberg | 190/57 |
| 1,448,986 | 3/1923 | Zimmers | 296/135 UX |
| 1,792,718 | 2/1931 | Stoll | 24/31 L |
| 1,936,087 | 11/1933 | Howard | 52/716 |
| 1,977,626 | 10/1934 | Finkelstein | 190/57 |
| 3,115,227 | 12/1963 | Shanok et al. | 190/57 |
| 3,183,549 | 5/1965 | Hammesfahr | 16/125 |
| 3,736,621 | 6/1973 | Szabo | 16/125 X |
| 3,737,944 | 6/1973 | Szabo | 190/57 X |

*Primary Examiner*—Donald A. Griffin
*Attorney, Agent, or Firm*—Harness, Dickey & Pierce

[57] ABSTRACT

The fitting is an elongated door or like pull strap which is ornamental and well suited for blending, or contrasting, with the decor of a passenger automobile interior. Certain embodiments are intended for installation on a door or other interior panel of a vehicle of the so-called luxury type; in other adaptations use in a less expensive or standard, less luxuriously appointed vehicle is contemplated. However, in all forms a basic and common feature relates to a bracket-mounted strap which presents a well cushioned or padded surface which faces the associated auto panel and is therefore felt by the fingers of the hand of a vehicle occupant; this is diametrically opposed to a finger grip on the rigid, inherently unyielding surface characteristic of automotive door and related pull straps in current use, which surface faces the panel also.

26 Claims, 9 Drawing Figures

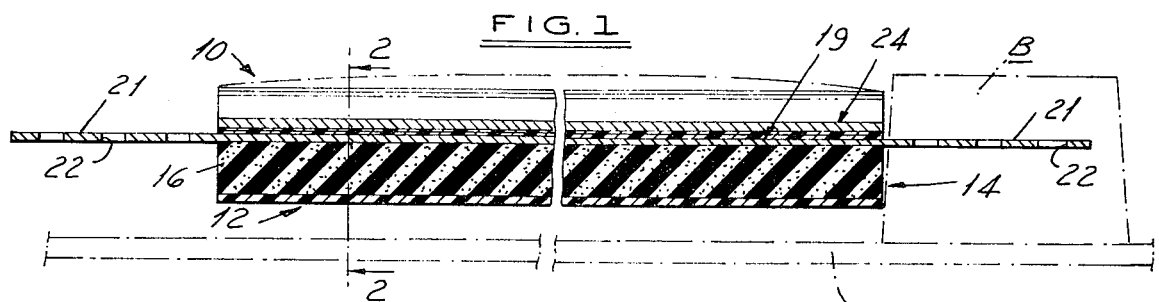
FIG. 1
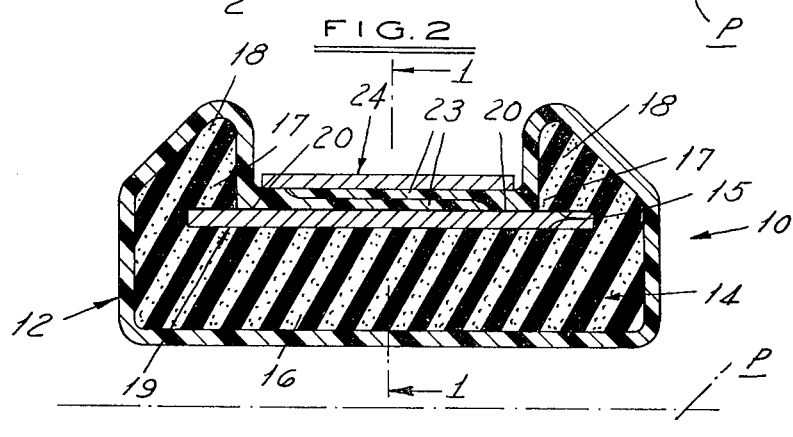
FIG. 2
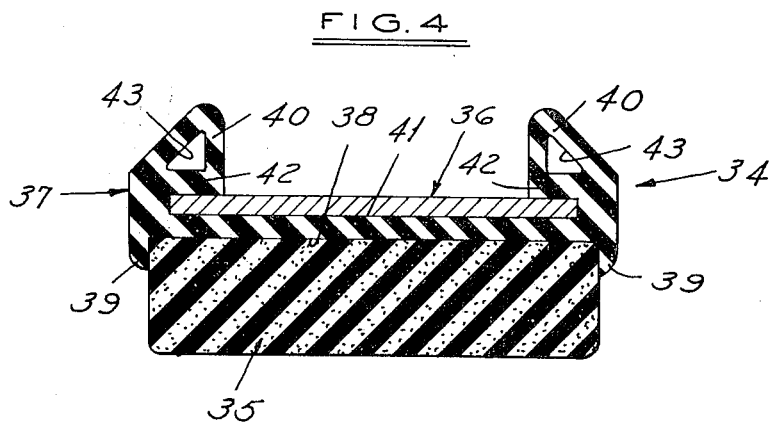
FIG. 3
FIG. 4

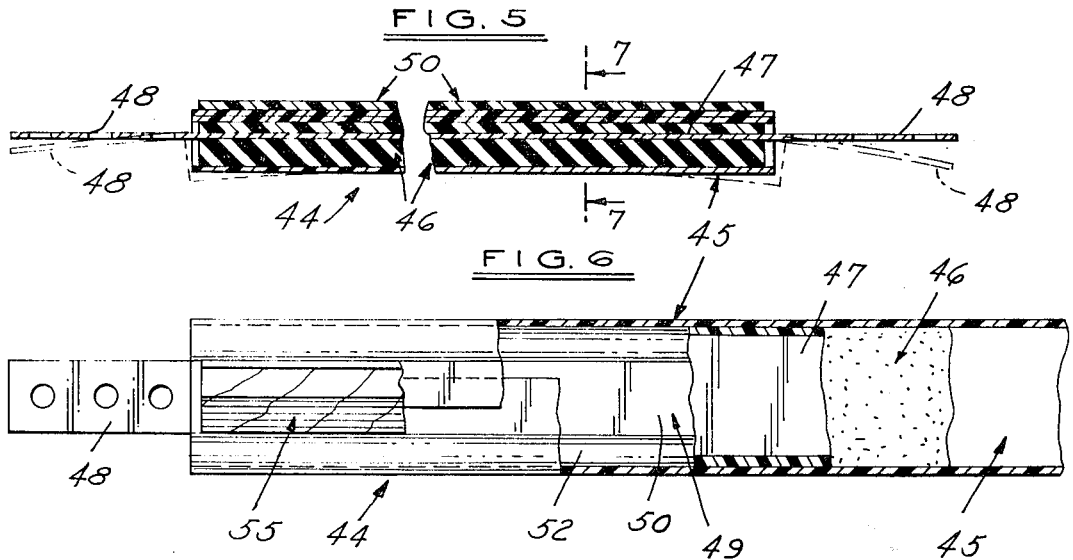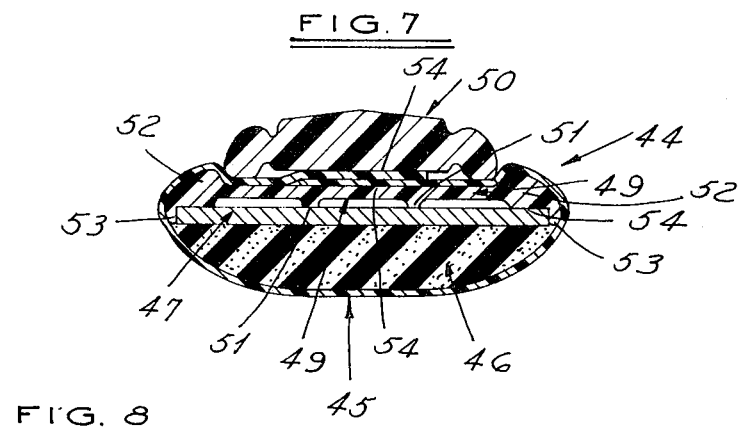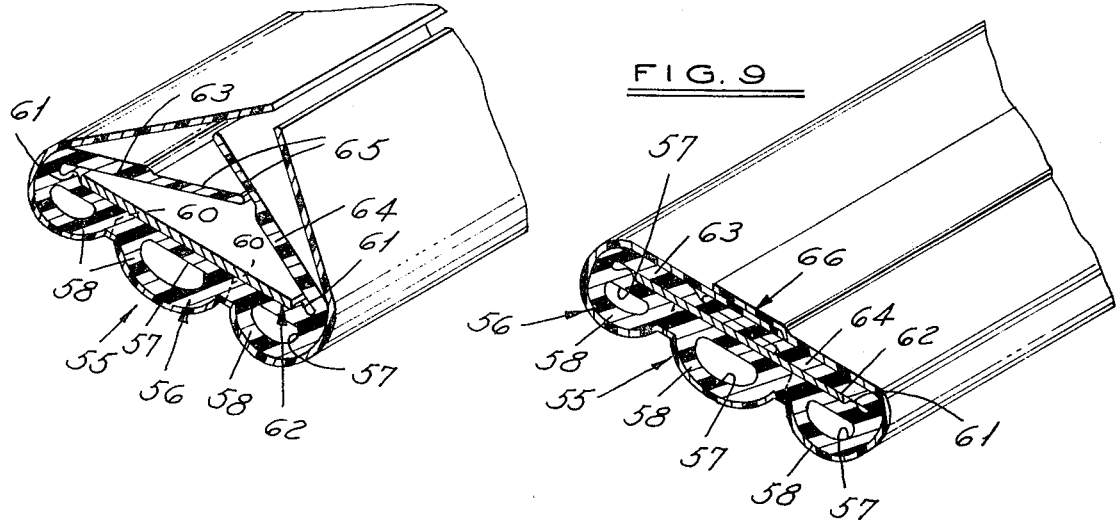

STRAP FITTING FOR AUTOMOBILE INTERIOR AND OTHER USES

BACKGROUND OF THE INVENTION

1. Field of the Invention

The improved strap, in all forms thereof, was especially devised for use in fitting out the upholstered interior of a passenger automobile. However, various other applications may well be found in other types of product, for example, hand grips for luggage, in manually operated cabinet work components, and the like.

2. Description of the Prior Art

To our knowledge, the most pertinent prior art is represented by the manufacturing procedure for existing conventional automotive door pull straps, comprising a base strip, a backing strip and a facing, but otherwise lacking the special cushioning and other features and advantages mentioned in the Abstract.

That is, in the prior making of related or comparable automotive interior pull strap fittings of which we are aware, the product essentially comprised an elongated steel stabilizing base strip have longitudinally superimposed thereon an elongated extruded vinyl backing strip. This backing member had a vinyl-coated fabric facing sheet or strip stitched centrally therealong, thus constituting a two-part sub-assembly of the plastic-containing components.

With a preliminary lamination of steel and plastic components, the vinyl-coated facing strip was wrapped about the unit and had its plastic containing components thermally fused together under high frequency dielectric heat along the longitudinal seam zone of the facing sheet edges as overlapped, i.e., at the area of contact of said facing component with the vinyl backing strip.

However, as bracket-mounted to an upholstered interior door panel, the strap presented a rigid, unyielding feel to the finger grasp of the car occupant, a feature which is unacceptable in present day automobile interior equipment, particularly in the luxury class car.

SUMMARY OF THE INVENTION

In all of the embodiments shown herein the strap is made up of an elongated, flexible steel bracing or base strip, conventionally formed at its ends for mounting to the inner upholstered panel of the door of the vehicle, as by conventional molded plastic or die-cast end brackets. This steel base is abutted, along the major intermediate length of its surface which will be toward said door panel, by an elongated cushion or pad of vinyl foam, sponge rubber or equivalent, this element being somewhat greater in width than the steel base strip and being of generous thickness for the desired feel.

The surface of the steel strip abutted by the cushion or pad is by preference coated with plastisol to afford a good adhesion of these parts when the plastic components are heat-activated in the manner to be described, whereupon an externally vinyl-coated fabric facing strip or sheet is snugly wrapped, fabric side in, about the steel base and cushion member sub-assembly. As for the cushion member per se, it may, as noted above, be a foam product, or it may derive its yieldability from its inherent elasticity, if of solid material, or by the formation of air channels therein and therealong.

With the base and cushion parts in place and the vinyl-coated facing sheet wrapped snugly therearound and well overlapped at a substantial seam zone centrally therealong opposite the cushion, an attractive elongated external trim strip member of one sort or another (to be described) is placed along the seam overlap. The four parts being snugly held together in a die unit, and under tensioning of the wrapped facing strip as described, the plastics of said facing and trim strips, also their plastic interbond, if present, are thermally energized dielectrically at radio frequency to produce an intimate fusion thereof due to the molecular activity of the heated plastic material. The thus formed strap product, when cooled to set it plasticwise, is then shaped physically in an appropriate forming die or fixture so as to produce a mildly arcuate conformation spacing it centrally from the door panel, to be readily grasped by the user.

In regard to the seaming of the vinyl-coated facing strip or sheet, one aspect of the invention contemplates that its seam edges be oppositely rabbeted, so that as well lapped and heat sealed together they provide a surface of uniform thickness across the width of the steel base strip engaged thereby. Another variant employs an edge-butted relationship along the seam to the same end.

It is to be understood that while a vinyl composition is herein instanced as the preferred plastic for use in the indicated parts, and a radio-frequency dielectric fusion for activation of their bond, other equivalent materials and concepts are contemplated, save as limited in the claims to follow.

BRIEF DESCRIPTION OF THE DRAWING

FIG. 1 is a view in longitudinal center cross-section, partially broken away and on a line corresponding to line 1—1 of FIG. 2, of one of the preferred embodiments of the cushioned strap construction in a rabbeted-seam type, the view showing the relationship of the strap to an upholstered automotive interior panel which appears in dot-dash line;

FIG. 2 is an enlarged scale view of this construction in transverse vertical cross-section plane along line 2—2 of FIG. 1;

FIG. 3 is a sectional view similar to FIG. 2 of a closely related alternative and preferred embodiment of the strap construction, in which an edge-butted facing strip seam is employed;

FIG. 4 is a similar sectional view, of a rather skeletal nature, showing an optional unwrapped sub-assembly of a foam cushion strip, a base strip and a base and cushion-locating and adapter component, the latter being undercut-grooved for the purpose and being in this case a molting or extrusion of a relatively solid material such as rubber or yieldable plastic having internal passaging therealong to impart a resilient compressability thereto;

FIG. 5 is a sectional view, partially broken away and generally similar to FIG. 1, of an alternative early form of the strap fitting, being in vertical longitudinal cross section in a plane central of the strap, this view showing laminated components including a seam-concealing trim strip, a steel base strip, a foam cushion strip, a wrap-around facing strip or sheet, and also an extruded plastic adapter strip which is absent as such, in the embodiments of FIGS. 2 and 3, but has an equivalent in the FIG. 4 embodiments;

FIG. 6 is a fragmentary plan view of the strap of FIG. 5, being partially broken away along its length to show the various individual plastic and metal components;

FIG. 7 is an enlarged scale view in transverse section on line 7—7 of FIG. 5;

FIG. 8 is a fragmentary perspective and transversely sectioned view showing partially assembled components of another earlier rabbet-seamed strap construction which also affords an air-cushioned feel to the grip of the occupant; and FIG. 9 is a similar fragmentary perspective and sectioned view showing the article of FIG. 8 in a fully bonded and completed form.

DESCRIPTION OF PREFERRED EMBODIMENTS

One embodiment of the luxury-type fitting of the invention, as illustrated and generally designated 10 in FIGS. 1 and 2, comprises a dielectrically fused lamination of strip components including an elongated fabric-backed facing strip or sheet 12, (edge-lapped portions of which are later described), which strip is externally face-coated with a dielectrically activatable thermoplastic coating composition, preferably, as appears from the above, a vinyl formulation. This is colored and/or textured to match, blend or contrast with the upholstery of the inner panel P of an automobile door or other interior finish surface. In applications other than to an automotive fitting, material, coloration and texture will be appropriate to the desired purpose.

The composition of the plastic facing (and this also applies to other vinyl or equivalent plastic components of the product) is such that it dielectrically fuses and bonds with the material of any other resinous component, typically under radio frequency electric current of the order of 27¼ megacycles per second. The resultant extreme inter-polar molecular activity of the facing composition of strip 12 and other like plastic components produces a rapid and intimate bonding fushion of all thereof which engage another related type surface, including the trim strip and plastic adhesive components later referred to. The facing vinyl permeates its fabric backing and bonds integrally with other such parts. It is to be understood that this thermal fushion is performed only after all the components of the embodiment 10 have been completely assembled in place and held together, as in an appropriate heating form, press or fixture (not shown) which is electrically energized at the indicated frequency.

The strap 10 comprises an elongated and relatively thick pad or cushion strip 14, shown as being an extruded or otherwise molded section of vinyl, rubber or polyurethane foam and substantially coextensive but slightly shorter as illustrated in length than the main body portion of the fitting 10 as shown in FIG. 5.

Pad or cushion 14 is sectionally shaped (FIG. 2) to provide a transversely elongated undercut groove or slot 15 which bottoms along a major portion of the transverse width of a main body portion 16 of the pad and opens longitudinally as the latter's ends; and the side edges of undercut groove 15 are defined by the inturned flange portion 17 of two like shoulders 18 integral with the pad body 16.

A second essential component of the strap 10 is an elongated flexible steel stabilizing base strip 19 whose transverse width is only slightly (if at all) less than that of the undercut groove 15. Strip 19 is pre-coated on its surface which will face opposite the pad or cushion body 16 with an appropriate thermally activated or energizable plastisol adhesive composition 20, and easy access of steel strip 19 to the groove 15 is had by first bending out and then releasing the pad shoulders 18, thus properly locating and confining base strip 19.

Typically, for the pull strap use contemplated by the invention, the steel component 19 has a central body midportion which is substantially coextensive but slightly longer as illustrated in its own length with the cushion 14, which body portion is provided at opposite ends with conventional reduced width tabs 21, as shown in FIG. 1. These are apertured at 22 for mounting the strap 10 to molded plastic bracket pieces B, as by bolt or stud means. The strap member is fixedly attached to the inner door panel or other mounting surface through the agency of these bracket provisions.

The fabric-backed and vinyl-coated facing strip or sheet 12 referred to above is applied reasonably tightly around the base and cushion strip sub-assembly, being drawn snugly about the rounded cushion shoulders 18; and the edges of strip 12 are substantially overlapped flatwise on one another along a relatively wide central seam zone. Said edges are each rabbeted and lap-mated at 23 along their relatively wide extreme outer portions to aford a resultant flat-lapped seam or joint which is, as best shown in FIG. 2, of the same overall thickness as the remaining un-rabbeted body of the facing strip 12.

With said wrapped strip under tension, a final ornamental trim strip 24 is laid in place along and over the seamed joint zone, wholly covering the latter and being centered between the wrapped cushion pad shoulders 18. Strip 24 may be, for example, a relatively thin steel length ornamentally finished on its exposed surface, as typically by anodizing; or it may be a non-metallic length of resin-impregnated body cloth or the like, of the sort later referred to. Its length equals that of facing 12. A length of a plastic composition such as Mylar is also contemplated.

Following this the application of dielectric fusing heat at the previously mentioned high frequency completes the union of parts. The highly thermo-conductive quality of the steel strip 19 of course promotes a fast and uniform distribution of dielectric heat to the non-metallic parts; such parts include the plastisol upper coating 20 of strip 19 and, as desired, another such coating 20 on its opposite side. This union of parts will inherently prevent any shifting of the facing strip relative to the base strip.

The embodiment of the improved strap fixture appearing in FIG. 3, and generally designated 30, is very similar to that of FIGS. 1 and 2, to the extent that corresponding numerals, primed, are employed to designate corresponding parts and further description thereof is dispensed with.

Strap 30, for one thing, embodies an edge-butted relationship at 31 of its seamed edge areas, rather than the rabbeted and overlapped seaming zones 23 of the first form. A constant thickness joint then exists across the portion of the width of the steel base strip 19 which engages said seamed joint. Moreover, in this case the seam is concealed by a length of a Mylar extrusion, specially designated 32, having an attractive finish, for example a wood-grained one bordered by simulated chrome stripes; and many other types of trim stripping are of course available in substitution for the ornamental metal trim of FIGS. 1 and 2. Furthermore, an appropriate resin-impregnated body cloth or a fabric-backed vinyl sheeting are optional trim strip substitutes in any embodiment of the invention. As will appear from FIG. 4, the foam pad or cushion strip may be supplemented by an additional yieldable strip component which affords not only means for laterally locating and confining said cushion, but also similarly receives and retains the flexible steel base strip.

Thus, FIG. 4 illustrates a sub-assembly 34 of a foam cushion pad 35, a steel stabilizing and base strip 36 and an intermediate adapter strip length 37 of solid section, for example an extrusion or otherwise molded section of rubber or equivalent resilient elastomer. This adapter strip has an elongated wide bottom groove 38 defined by parallel side lips 39 between which the pad 35 is snugly received.

The strip 37 has integrally molded shoulders 40 contoured similarly to the shoulders 18 and 18' of the prior forms 10 and 30, and between said shoulders an undercut groove 41 is formed in the strip. This is in part defined by inwardly extending lips 42 of the shoulders, which lips resiliently retain base strip 36 from above. As in the case of the straps 10 and 30, the shoulders 40 are to be rolled back to expose groove 41 to receive the strip 36, then released onto the latter above the side undercuts of the cushion groove.

For the purpose of enhancing its resilient compressibility, the adapter strip 37 is formed to provide parallel elongated air channels 43 in and along each of its rounded shoulders 40; and the sub-assembly unit 34 will have a vinyl or equivalent coated facing sheet (not shown) snugly wound about it under tension, then dielectrically bonded, seamed and finish-ornamented to conceal the seaming, exactly as described above in the case of the strap structures 10 and 30.

Pursuant to one of the earlier developments of the invention the strap fitting, as illustrated in FIGS. 5, 6 and 7 and generally designated 44, is characterized by a resin-coated facing strip 45, a steel base strip 47 having reduced width mounting extensions 48, and adapter extrusion strip 49 (generally similar to the adapter 37 of FIG. 4) and an ornamentation strip 50, all have the characteristics previously described, hence need no further amplification. In this case the adapter 49 has a flat and relatively wide body portion which carries on its lower surface a pair of integral ribs 51 for stable intermediate engagement with steel strip 47 upon opposite sides of these ribs; and the adapter's side edges carry rounded shoulder portions 52. These have stable flatwise engagement with base strip 47 along the latter's edges, and they terminate in integral bottom lips 53. Said lips are spaced from one another but a trifle more than the width of the strip 47, so as to mate over the edges of the latter, as illustrated in FIG. 7, and thus assist in registering and laterally confining the base and cushion parts against lateral shift. A heat activatable bonding agent may be employed, if desired. The edges of facing strip are shown as having a plain seam overlap at 54.

In the further alternative construction of FIGS. 8 and 9, specially designated by the reference numeral 55, a vinyl or other plastic extrusion 56 is sectioned to form three elongated and separate parallel cavities or air passages 57 which are coextensive in length with the extrusion. These are defined by separate external and convexly rounded hollow bead-like formations 58. Thus, a resilient cushioning "soft feel" action is imparted to said piece along the lateral surface thereof at which the finished strap fitting 55 of this form is felt by the fingers of the user.

Prior to being wrapped about the extrusion 25, the plastic-backed fabric facing sheet or strip has said extrusion secured in place thereon by parallel lines of machine stitching 60 between the hollow air-cushioning formations 58. Thus, a two-part sub-assembly of cushioned strip members may be prefabricated for later mass completion. The completed strap fitting of this form appears partially in FIG. 9.

On its surface opposite the convexly molded surface the strip 56 carries a pair of parallel integral ribs 61 between which the steel stabilizing base strip 62 is registered and laterally held in place.

The molded plastic part above referred to further carries a pair of generally similar wide longitudinally extending parallel legs or flanges 63, 64 integral with and along its sides. Said flanges are molded along their extreme outer zones to afford reduced-thickness, oppositely rabbeted lap extensions 65, which are so proportioned that, after the flanges 63, 64 have been bent inwardly toward one another and down onto the steel strip 62, a resultant flat-lapped joint zone at 66 is, as best shown in FIG. 9, of the same overall thickness as the remainder of the flange portions. In this respect the sectioning of the extrusion flanges resembles that of the rabbeted facing edge joint 23 of the embodiment of FIGS. 1 and 2. High frequency dielectric fusing heat completes the union of parts.

What is claimed is:

1. A strap construction for mounting on and across at least a portion of a panel or like surface, comprising an assembly of an elongated base strip, a cushion strip of a relatively shorter length than said base strip disposed lengthwise along said base strip on the side of the assembly to face said surface portion as the strap construction is mounted thereto, and a facing strip slightly longer than said cushion strip but shorter than said base strip wrapped around said base and cushion strips, said facing strip having longitudinal edge members adjacent one another which extend along the side of said assembly opposite the side on which the cushion strip is disposed thus to face away from said surface portion, said longitudinal edges and elongated base strip being secured by suitable bonding means to prevent shifting of said facing strip relative to said base strip, and the ends of said assembly being adapted to connect the strap construction to said surface portion.

2. The strap construction of claim 1, in which said cushion strip comprises a length of resilient foam material smoothly encased by said wrapped facing strip at said first-named side of the assembly.

3. The strap construction of claim 2 in which said facing strip has a coating of a plastic resin material disposed on the outer surface thereof, and further comprising a plastic resin material applied to one side of said elongated base strip which side engages said longitudinal edges of said facing strip, said plastic resin materials being dielectrically heat-fusible, and said bonding means comprises a dielectric heat fusion.

4. The strap construction of claim 2, and further comprising a non-metallic adapter strip having a groove receiving a side of said base strip said adapter strip being disposed between said cushion strip and said elongated base strip and the combination thereof being snugly engaged and covered by said facing strip.

5. The strap construction of claim 1, and further comprising an external ornamental trim strip lying along and concealing said edges of the facing strip.

6. The strap construction of claim 5 in which said facing strip has a coating of a plastic resin material disposed on the outer surface thereof, and further comprising a plastic resin material applied to one side of said elongated base strip which side engages said longitudinal edges of said facing strip, said plastic resin materials being dielectrically heat-fusible, and said bonding means comprises a dielectric heat fusion.

7. The strap construction of claim 6, in which said facing strip has side edges which are in an edge-to-edge relation to one another along said opposite side of the assembly, being concealed by said trim strip.

8. The strap construction of claim 7, in which said trim strip is of a dielectrically heat-fusible material.

9. The strap construction of claim 7 in which said trim strip is of metal and further includes a plastic resin material applied to one side thereof which side engages said facing strip and elongated base strip.

10. The strap construction of claim 6, in which said trim strip is of a dielectrically heat-fusible material.

11. The strap construction of claim 5, in which said facing strip has side edges which are in an edge-to-edge relation to one another along said opposite side of the assembly, being concealed by said trim strip.

12. The strap construction of claim 5, in which said trim strip is of metal.

13. The strap construction of claim 6 in which said trim strip is of metal and further includes a plastic resin material applied to one side thereof which side engages said facing strip and elongated base strip.

14. The strap construction of claim 5, and further comprising a non-metallic adapter strip having a groove receiving a side of said base strip said adapter strip being disposed between said cushion strip and said elongated base strip and the combination thereof being snugly engaged and covered by said facing strip.

15. The strap construction of claim 1 in which said facing strip has a coating of a plastic resin material disposed on the outer surface therof, and further comprising a plastic resin material applied to one side of said elongated base strip which side engages said longitudinal edges of said facing strip, said plastic resin materials being dielectrically heat-fusible, and said bonding means comprises a dielectric heat fusion.

16. The strap construction of claim 1 and further comprising a non-metallic adapter strip having a groove receiving a side of said base strip, said adapter strip being disposed between said cushion strip and said elongated base strip and the combination thereof being snugly engaged and covered by said facing strip.

17. A strap construction for mounting on and across a portion of a panel or like surface, comprising an elongated base strip with opposite ends being adapted for attachment to said panel, a cushion strip formed from a resilient foam material disposed on one side of said base strip, an adapter strip disposed between said cushion strip and said base strip on said one side of said base strip, said adapter strip formed of a solid but resiliently flexible plastic type material and further including a groove formed therein and receiving said base strip, a facing strip wrapped snugly around the assembly of said adapter strip, cushion strip and base strip, the longitudinal edges of said facing strip being on the side of said base strip opposite said one side of said base strip, a trim strip disposed over the longitudinal edges of said facing strip and being secured to said facing strip.

18. The strap construction set forth in claim 17 wherein said trim strip is secured to said facing strip by bonding means comprising a plastic resin material applied to the side of said base strip which engages said longitudinal edges of said facing strip, said trim strip is of a dielectric heat fusible material and said trim strip, said base strip and said longitudinal edges of said facing strip are secured by a dielectric heat fusion.

19. The strap construction of claim 17 wherein said base strip is of metal.

20. The strap construction of claim 17 wherein said adapter strip further comprises a pair of parallel longitudinal extending shoulders which define and project above said slot formed therein.

21. The strap construction of claim 17 wherein said cushion strip has a length less than the length of said base strip.

22. The strap construction of claim 21 wherein said adapter strip has a length longer than the length of said cushion strip and shorter than the length of said base strip.

23. The strap construction of claim 21 wherein said facing strip has a length at least as long as the length of said adapter strip.

24. The strap construction of claim 17 in which said facing strip comprises a plastic resin or vinyl-type material.

25. The strap construction of claim 17 wherein said longitudinal edges of said facing strip are in abutting or spaced-apart relationship on the side of said base strip opposite said one side of said base strip.

26. The strap construction of claim 17 further including means bonding said base strip to said facing strip.

* * * * *